United States Patent [19]
Cordola et al.

[11] Patent Number: 5,173,026
[45] Date of Patent: Dec. 22, 1992

[54] CLIP HAVING PERIPHERAL SEALING

[75] Inventors: Jean-Pierre Cordola, Garches; Pierre Guillon, Taverny, both of France

[73] Assignee: ITW de France, Beauchamp, France

[21] Appl. No.: 836,897

[22] Filed: Feb. 19, 1992

[30] Foreign Application Priority Data

Feb. 22, 1991 [FR] France .................... 91 02164

[51] Int. Cl.$^5$ .................... F16B 19/00; F16B 43/02
[52] U.S. Cl. .................... 411/508; 411/369; 411/542; 411/913; 24/297
[58] Field of Search ........ 411/369, 370, 377, 508–510, 411/542, 907, 908, 913; 24/297; 277/212 F, 233

[56] References Cited

U.S. PATENT DOCUMENTS

| | | | |
|---|---|---|---|
| 3,309,955 | 3/1967 | Turnbull et al. | 411/509 |
| 3,810,279 | 5/1974 | Swick et al. | 411/509 |
| 3,860,999 | 1/1975 | Meyer | 411/510 |
| 4,393,551 | 7/1983 | Wollar et al. | 411/509 |
| 4,810,147 | 3/1989 | Hirohata | 411/508 |
| 5,011,162 | 4/1991 | Jelinek | 411/369 |
| 5,035,560 | 7/1991 | Watanabe et al. | 411/508 |

FOREIGN PATENT DOCUMENTS

| | | |
|---|---|---|
| 1411521 | 10/1964 | France . |
| 1464727 | 11/1965 | France . |
| 2398913 | 2/1979 | France . |
| 2438759 | 5/1980 | France . |
| 813048 | 5/1959 | United Kingdom . |

Primary Examiner—Neill R. Wilson
Attorney, Agent, or Firm—Schwartz & Weinrieb

[57] ABSTRACT

A clip for fixing a panel (17) to a support (18), comprising: a relatively stiff moulded plastics material body (1) having a head (2) adapted to be mounted to the panel through an orifice (19), a foot (3) adapted to be mounted to the support through an orifice (20), a flange at the place where the foot (3) and the head (2) merge and a relatively soft plastics material washer cooperating with the flange to provide a seal with the support characterized in that the washer (14) is overmoulded onto the periphery of the flange (4).

11 Claims, 2 Drawing Sheets

CLIP HAVING PERIPHERAL SEALING

FIELD OF THE INVENTION

The invention concerns a clip for fixing a panel to a support.

BACKGROUND OF THE INVENTION

There is already known, in particular from French patent 75-33709, a clip of this kind comprising a relatively stiff moulded plastics material body having a head adapted to be mounted to the panel through an orifice, a foot adapted to be mounted to the support through an orifice, a frustoconical flange at the place where the foot and the head merge, widening towards the foot and a relatively soft plastics material washer comprising a projecting lip with the same dimensions on each of its inner and outer peripheries, said washer being engaged in the foot and bearing against the flange.

The clip is usually employed to fix automobile door lining panels: the panel comprises a series of holes in each of which a clip is mounted after which the panel is offered up to the door or support which comprises a series of orifices in corresponding relationship into which the feet of the clips are snap-fastened when the panel is pressed against the support. In the fixed position the flange and the washer are gripped between the panel and the support, the flange bearing against the panel and the washer against the support, the cooperation of the frustoconical flange with the washer producing an excellent seal.

OBJECT OF THE INVENTION

The invention is directed to improving this type of clip and in particular to improving its reliability at the time of mounting and enhancing its performance in service.

To this end, it proposes a clip for fixing a panel to a support, comprising: a relatively stiff moulded plastics material body having a head adapted to be mounted to the panel through an orifice, a foot adapted to be mounted to the support through an orifice, a flange at the place where the foot and the head merge and a relatively soft plastics material washer cooperating with the flange to provide a seal with the support characterised in that the washer is overmoulded onto the periphery of the flange.

Because the washer is overmoulded onto a part of the body there is no longer any risk of it being lost, which is particularly advantageous when automatic fitting means are used because it entirely prevents the risk of assembling to a support a panel on which some clips have no washer.

Furthermore, as the part that is overmoulded is the flange, the latter cooperates with the panel not by way of direct contact but through the material of the washer. As the latter is made from a soft material, this eliminates the noise experienced with the prior art clip at the place of contact between the panel and the flange.

According to preferred features of the invention, the periphery of the flange, over which the washer is overmoulded, is formed of independent blade members.

These blades can therefore bend without impeding each other so that the washer-flange assembly can deform easily which is beneficial with respect to sealing and with respect to taking up assembly clearance. Furthermore, the spaces between the blade members are beneficial to the overmoulding operation and strengthen the attachment of the washer to the flange.

Said blade members are advantageously thinner than a central part of the flange.

This achieves a good compromise between the stiffness required for fixing (contributed by the central part of the flange) and the flexibility of the flange-washer assembly required for sealing and to take up clearances.

According to other preferred features of the invention the flange is substantially flat and the washer incorporates a peripheral outside lip projecting on the side towards the foot and optionally a peripheral inside lip projecting on the side towards the foot to a lesser degree than the outside lip.

This reproduces to some extent the spring effect achieved in the prior art clip by virtue of the conical design of the flange but with a reduced overall thickness of the flange-washer assembly which has the advantage that the panel lies flatter against the support.

BRIEF DESCRIPTION OF THE DRAWINGS

The explanation of the invention will now continue with the description of a preferred embodiment of the invention given hereinafter by way of non-limiting example only and with reference to the appended drawings in which.

DETAILED DESCRIPTION OF THE PREFERRED EMBODIMENT

Figure 1:
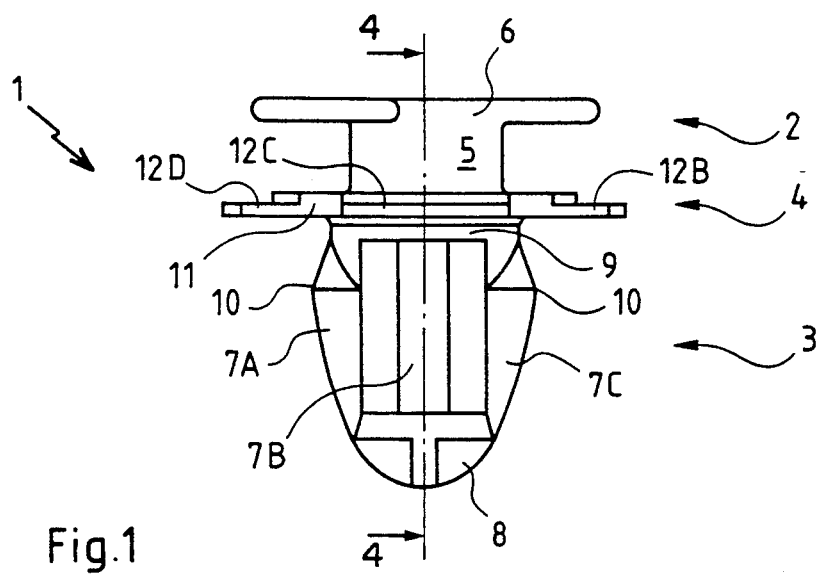
FIG. 1 is a front view in elevation of the body of the clip in accordance with the invention.

The clip shown comprises a relatively stiff moulded plastics material body 1 having a head 2, a foot 3 and a flange 4 at the place where the foot and the head merge.

The head 2 comprises a T-shape cross-section central member 5 to the end of which is joined a transverse flat cap 6 substantially in the form of a circular sector which is solid over 270°.

Figure 2:
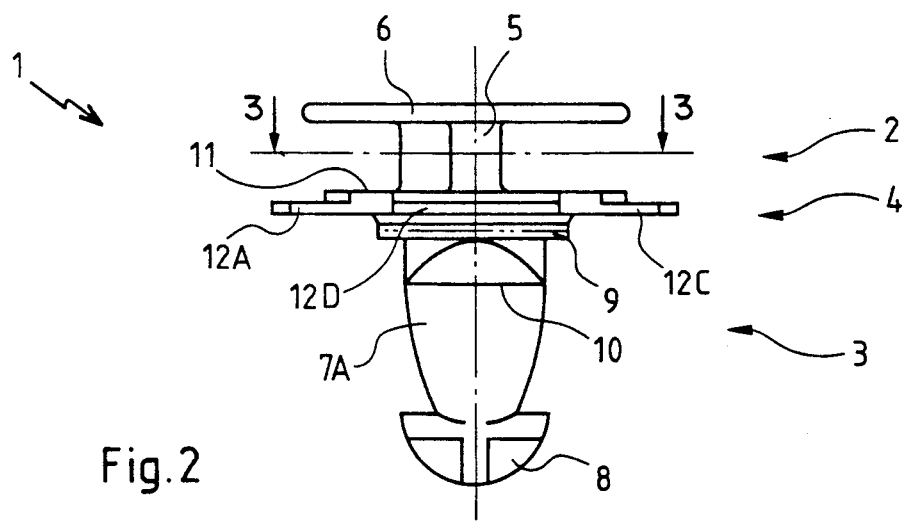
FIG. 2 is another view of it in elevation as seen from the lefthand side in FIG. 1.
Figure 3:
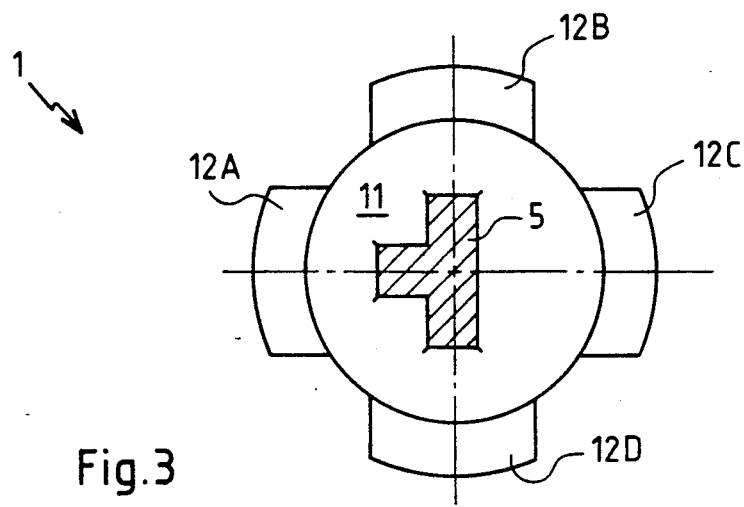
FIG. 3 is a cross-section on the line 3—3 in FIG. 2.

The foot 3 comprises three members 7A, 7B and 7C which link a cruciform cross-section rounded end 8 and an approximately circular portion 9. The central member 7B has an approximately square cross-section while the lateral members 7A and 7C are flat on the inside and convex on the outside. The width of the foot 2 increases from the end 8 to a limit 10 from which it decreases as far as the portion 9 (see FIG. 1). The thickness of the foot is less than the diameter of the portion 9 (see FIG. 2).

The flange 4 is substantially flat. It has a solid circular central portion 11 to which the member 5 is joined on one side and the portion 9 is joined on the opposite side. The periphery of the flange 4 is formed by four independent radial blade members 12A, 12B, 12C and 12D separated by a gap and which are thinner than the central part 11. The lower surfaces (that is to say the surfaces on the same side as the foot 3) of the blade members 12A through 12D and of the central part 11 are coplanar.

Figure 4:
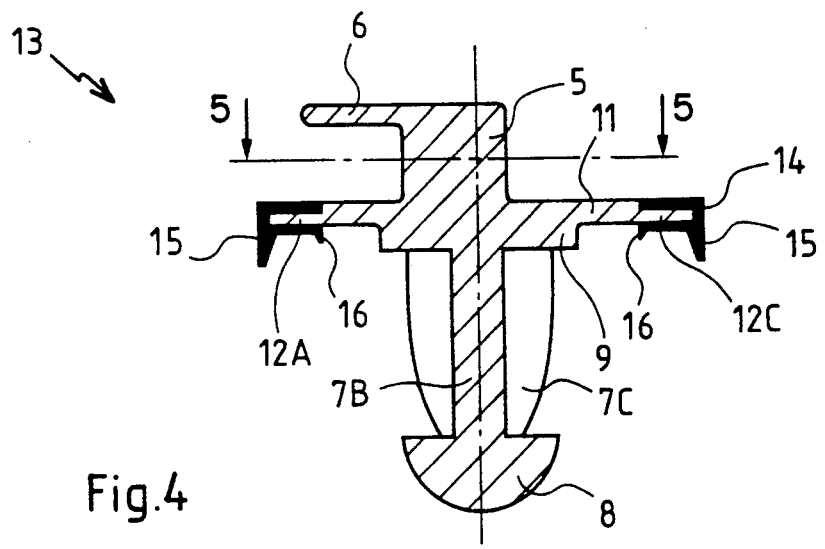
FIG. 4 is a view in cross-section of the complete clip on the line 4—4 in FIG. 1.
Figure 5:
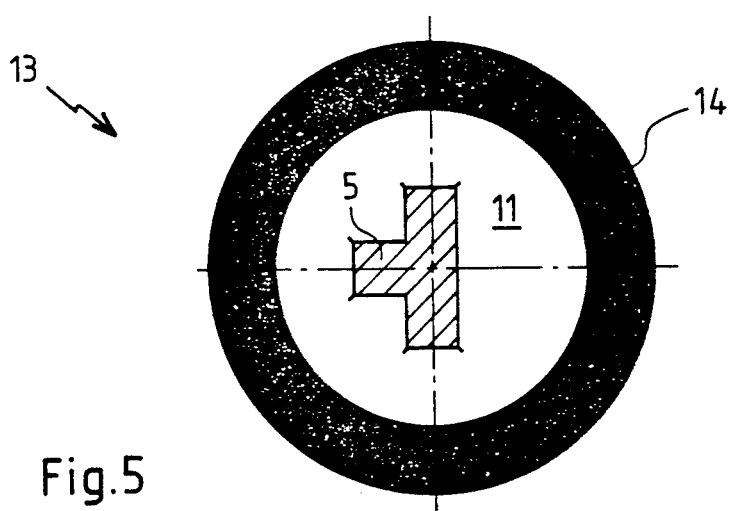
FIG. 5 is a view in cross-section on the line 5—5 in FIG. 4.
Figure 6:
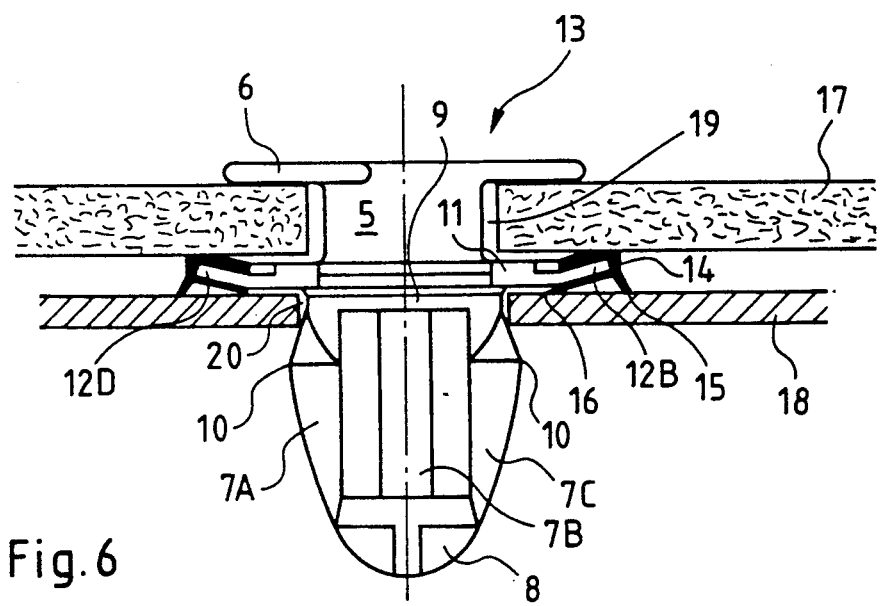
FIG. 6 is a view in elevation partly in cross-section showing the clip securing a panel to a support, the clip being shown not in cross-section, as in FIG. 1.

The complete clip 13 shown in FIGS. 4 to 6 further comprises in addition to the body 1 a relatively soft plastics material annular portion 14 overmoulded onto the periphery of the flange, to be more precise onto the blade members 12A through 12D, so as to envelop peripheral portions 12A through 12D.

The washer 14 comprises a peripheral outside lip 15 projecting on the side towards the foot 3 and a peripheral inside clip 16 projecting on the side towards the foot 3 to a lesser degree than the outside lip 15.

The clip 13 is designed (see FIG. 6) to fix a panel 17 such as a lining panel to a support 18 such as an automobile door.

The panel 17 comprises a series of circular orifices 19 whose diameter is related to the width of the member 5. A clip 13 is mounted in each orifice 9 by passing the quarter-disc part of the cap 6 through the orifice and then straightening the clip 13 so that it is coaxial with the orifice 19 and finally turning the clip 13 through 90°.

Once all the clips 13 have been mounted the panel 17 is offered up to the support 18 which is formed with orifices 20 at locations in corresponding relationship to the orifices 19. The orifices 20 are circular and their diameter is related to that of the portion 9. The feet 3 are snap-fastened into the orifices 20: the members 7A and 7C encounter the edges of the orifice and fold inwardly by virtue of the elasticity of the plastics material and the gap between them and the central member 7B until the limit 10 is passed and then they expand. Because of the slope of the upper part of the members 7A and 7C the elasticity of the plastics material tends to draw the foot 3 into the orifice 20. The combination of the flange 4 and the washer 14 is then gripped between the panel 17 and the support 18 and is deformed in the manner shown in FIG. 6.

Note that all clearances between the clip 13, the panel 17 and the support 18 are taken up and that there is no direct contact between the flange 4 and the panel 17 or the support 18, all contact occurring through the washer 14 whose upper part bears on the panel 17 and whose lips 15 and 16 are in contact with the support 18.

Note that numerous variations are feasible in particular as to the shape of the foot and the head.

Of course, the invention is not limited to the preferred embodiment that has just been described but on the contrary encompasses all variants that suggest themselves to the man skilled in the art.

We claim:

1. A clip for fixing a panel (17) to a support (18), comprising:
    a relatively stiff, molded plastic material body member (1) having a head (2) adapted to engage and be mounted within said panel through means of an orifice (19), a foot (3) adapted to be mounted within said support (18) through means of an orifice (20), and a flange (4) disposed at a location where said foot (3) and said head (2) merge; and
    a relatively soft, plastic material annular washer (14) cooperating with said flange (4) so as to provide a seal between said panel and said support;
    characterized in that said annular washer (14) envelops a peripheral portion of said flange (4).

2. Clip according to claim 1 characterised in that said peripheral portion of the flange (4) is formed of independent blade members (12A, 12B, 12C, 12D).

3. Clip according to claim 2 characterised in that said blade members (12A, 12B, 12C, 12D) are thinner than a central part (11) of the flange (4).

4. Clip according to claim 3, characterised in that the flange (4) is substantially flat and the washer (14) incorporates a peripheral outside lip (15) projecting on the side towards the foot (3).

5. Clip according to claim 4 characterised in that the washer (14) comprises a peripheral inside lip (16) projecting on the side towards the foot (3) to a lesser degree than said outside lip (15).

6. Clip according to claim 5, characterised in that said foot (3) is adapted to be mounted to said support (18) by snap-fastening.

7. Clip according to claim 6 characterised in that said foot comprises two side members (7A, 7C) which join an end piece (8) to a circular portion (9) and have a width increasing from the end piece (8) to a limit (10) from which it decreases to the circular portion (9).

8. Clip according to claim 7, characterised in that said head comprises a central member (5) to the end of which is joined a transverse flat cap (6) substantially in the shape of a solid circular sector subtending an angle of 270°.

9. In combination, a structural system, comprising:
    a panel having a first aperture defined therethrough;
    a support having a second aperture defined therethrough and to which said panel is to be secured; and
    a clip for fixedly mounting said panel upon said support;
    said clip comprising a head portion for engaging a first surface portion of said panel and adapted to be disposed within said first aperture of said panel; a foot portion disposed within said second aperture of said support and adapted to engage a first undersurface portion of said support; a flange member interposed between said head and foot portions; and an annular plastic washer enveloping a peripheral portion of said flange member for sealingly engaging a second undersurface portion of said panel and a second upper surface portion of said support.

10. The combination as set forth in claim 9, wherein: said flange member comprises four equiangularly arranged blade members.

11. The combination as set forth in claim 9, wherein said annular washer comprises:
    a first radially inner, annular lip portion having a first predetermined axial depth; and
    a second radially outer annular lip portion having a second predetermined axial depth which is greater than said first predetermined axial depth of said first radially inner, annular lip portion,
    whereupon assembly of said support and said panel together, said peripheral portion of said flange member is caused to be bent so as to define said sealing engagement between said annular plastic washer and said panel and support surface portions.

* * * * *